(12) United States Patent
Sandholzer et al.

(10) Patent No.: US 9,890,275 B2
(45) Date of Patent: Feb. 13, 2018

(54) HIGH FLOW POLYOLEFIN COMPOSITION WITH HIGH STIFFNESS AND TOUGHNESS

(71) Applicant: BOREALIS AG, Vienna (AT)

(72) Inventors: Martina Sandholzer, Linz (AT); Susanne Kahlen, Leonding (AT); Georg Grestenberger, St. Peter in der Au (AT)

(73) Assignee: Borealis AG, Vienna (AT)

( * ) Notice: Subject to any disclaimer, the term of this patent is extended or adjusted under 35 U.S.C. 154(b) by 94 days.

(21) Appl. No.: 14/911,295

(22) PCT Filed: Aug. 18, 2014

(86) PCT No.: PCT/EP2014/067543
§ 371 (c)(1),
(2) Date: Feb. 10, 2016

(87) PCT Pub. No.: WO2015/024891
PCT Pub. Date: Feb. 26, 2015

(65) Prior Publication Data
US 2016/0194486 A1 Jul. 7, 2016

(30) Foreign Application Priority Data
Aug. 21, 2013 (EP) .................................. 13181225

(51) Int. Cl.
*C08L 23/14* (2006.01)
*C08L 23/10* (2006.01)

(52) U.S. Cl.
CPC ............... *C08L 23/14* (2013.01); *C08L 23/10* (2013.01); *C08L 2205/025* (2013.01); *C08L 2207/02* (2013.01); *C08L 2308/00* (2013.01)

(58) Field of Classification Search
CPC ........ C08L 23/14; C08L 23/10; C08L 23/142; C08L 23/16; C08L 2205/025; C08L 2205/035; C08L 2207/02; C08L 2308/00
See application file for complete search history.

(56) References Cited

U.S. PATENT DOCUMENTS

| | | |
|---|---|---|
| 4,107,414 A | 8/1978 | Giannini et al. |
| 4,186,107 A | 1/1980 | Wagner |
| 4,226,963 A | 10/1980 | Giannini et al. |
| 4,347,160 A | 8/1982 | Epstein et al. |
| 4,382,019 A | 5/1983 | Greco |
| 4,435,550 A | 3/1984 | Ueno et al. |
| 4,465,782 A | 8/1984 | McKenzie |
| 4,472,524 A | 9/1984 | Albizzati |
| 4,473,660 A | 9/1984 | Albizzati et al. |
| 4,522,930 A | 6/1985 | Albizzati et al. |
| 4,530,912 A | 7/1985 | Pullukat et al. |
| 4,532,313 A | 7/1985 | Matlack |
| 4,560,671 A | 12/1985 | Gross et al. |
| 4,581,342 A | 4/1986 | Johnson et al. |
| 4,657,882 A | 4/1987 | Karayannis et al. |
| 4,665,208 A | 5/1987 | Welborn, Jr. et al. |
| 4,874,734 A | 10/1989 | Kioka et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,308,815 A | 5/1994 | Sangokoya |
| 5,329,032 A | 7/1994 | Tran et al. |
| 5,391,529 A | 2/1995 | Sangokoya |
| 5,391,793 A | 2/1995 | Marks et al. |
| 5,504,172 A | 4/1996 | Imuta et al. |
| 5,529,850 A | 6/1996 | Morini et al. |
| 5,539,067 A | 7/1996 | Parodi et al. |
| 5,618,771 A | 4/1997 | Parodi et al. |
| 5,693,838 A | 12/1997 | Sangokoya et al. |
| 5,731,253 A | 3/1998 | Sangokoya |
| 5,731,451 A | 3/1998 | Smith et al. |
| 5,744,656 A | 4/1998 | Askham |
| 6,316,562 B1 | 11/2001 | Munck et al. |
| 6,586,528 B1 | 7/2003 | Delaite et al. |
| 6,642,317 B1 | 11/2003 | Delaite et al. |
| 7,342,078 B2 | 3/2008 | Schottek et al. |
| 7,569,651 B2 | 8/2009 | Schottek et al. |
| 2003/0149199 A1 | 8/2003 | Schottek et al. |
| 2004/0033349 A1 | 2/2004 | Henderson |
| 2005/0136274 A1 | 6/2005 | Hamulski et al. |
| 2005/0187367 A1 | 8/2005 | Hori et al. |
| 2005/0200046 A1 | 9/2005 | Breese |
| 2006/0020096 A1 | 1/2006 | Schottek et al. |
| 2006/0182987 A1 | 8/2006 | Yu et al. |
| 2006/0211801 A1 | 9/2006 | Miller et al. |
| 2007/0235896 A1 | 10/2007 | McLeod et al. |
| 2008/0214767 A1 | 9/2008 | Mehta et al. |
| 2010/0029883 A1 | 2/2010 | Krajete et al. |
| 2010/0081760 A1 | 4/2010 | Rhee et al. |
| 2010/0099824 A1 | 4/2010 | Helland et al. |
| 2011/0031645 A1 | 2/2011 | Kuettel et al. |

(Continued)

FOREIGN PATENT DOCUMENTS

| | | |
|---|---|---|
| EP | 0 045 977 B1 | 1/1987 |
| EP | 0 260 130 A1 | 3/1988 |

(Continued)

OTHER PUBLICATIONS

Japanese Patent Office, Notice of Reasons for Rejection issued in Japanese Application No. 2016-535441 dated (Feb. 28, 2017).

(Continued)

*Primary Examiner* — Nathan M Nutter
(74) *Attorney, Agent, or Firm* — Leydig, Voit & Meyer, Ltd.

(57) ABSTRACT

The present invention relates to a polyolefin composition comprising two heterophasic propylene copolymers which differ in the melt flow rate.

16 Claims, No Drawings

(56) References Cited

U.S. PATENT DOCUMENTS

| | | | |
|---|---|---|---|
| 2012/0189830 A1 | 7/2012 | Niepelt et al. | |
| 2016/0185946 A1* | 6/2016 | Sandholzer et al. | C08L 23/10 525/240 |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |
| 2017/0009068 A1* | 1/2017 | Kahler et al. | C08L 23/12 |

FOREIGN PATENT DOCUMENTS

| | | |
|---|---|---|
| EP | 0 279 586 A2 | 8/1988 |
| EP | 0 045 975 B1 | 4/1989 |
| EP | 0 045 976 B1 | 11/1989 |
| EP | 0 361 493 A1 | 4/1990 |
| EP | 0 423 101 A2 | 4/1991 |
| EP | 0 488 595 A1 | 6/1992 |
| EP | 0 491 566 A2 | 6/1992 |
| EP | 0 537 130 A1 | 4/1993 |
| EP | 0 561 476 A1 | 9/1993 |
| EP | 0 045 976 B2 | 12/1993 |
| EP | 0 279 586 B1 | 4/1994 |
| EP | 0 594 218 A1 | 4/1994 |
| EP | 0 622 380 A1 | 11/1994 |
| EP | 0 045 977 B2 | 3/1995 |
| EP | 0 645 417 A1 | 3/1995 |
| EP | 0 728 769 A1 | 8/1996 |
| EP | 0 586 390 B1 | 5/1997 |
| EP | 0 591 224 B1 | 2/1998 |
| EP | 0 887 379 A1 | 12/1998 |
| EP | 0 887 380 A1 | 12/1998 |
| EP | 0 887 381 A1 | 12/1998 |
| EP | 1 028 984 B1 | 7/2001 |
| EP | 1 359 171 A1 | 11/2003 |
| EP | 1 376 516 A1 | 1/2004 |
| EP | 1 452 630 A1 | 9/2004 |
| EP | 1 183 307 B1 | 7/2005 |
| EP | 0 991 684 B1 | 1/2006 |
| EP | 1 632 529 A1 | 3/2006 |
| EP | 1 448 622 B1 | 4/2006 |
| EP | 1 726 602 A1 | 11/2006 |
| EP | 1 741 725 A1 | 1/2007 |
| EP | 1 788 023 A1 | 5/2007 |
| EP | 1 883 080 A1 | 1/2008 |
| EP | 1 892 264 A1 | 2/2008 |
| EP | 1 923 200 A1 | 5/2008 |
| EP | 1 941 997 A1 | 7/2008 |
| EP | 1 941 998 A1 | 7/2008 |
| EP | 1 947 143 A1 | 7/2008 |
| EP | 1 990 353 A1 | 11/2008 |
| EP | 2 014 714 A1 | 1/2009 |
| EP | 2 062 936 A1 | 5/2009 |
| EP | 2 065 087 A1 | 6/2009 |
| EP | 2 075 284 A1 | 7/2009 |
| EP | 2 174 980 A1 | 4/2010 |
| EP | 2 251 361 A1 | 11/2010 |
| EP | 2 386 582 A1 | 11/2011 |
| EP | 2 386 583 A1 | 11/2011 |
| EP | 2 386 602 A1 | 11/2011 |
| EP | 2 386 604 A1 | 11/2011 |
| EP | 2 038 346 B1 | 1/2012 |
| EP | 2 410 007 A1 | 1/2012 |
| EP | 2 415 831 A1 | 2/2012 |
| EP | 2 423 257 A1 * | 2/2012 ............. C08L 23/14 |
| EP | 1 358 252 B1 | 4/2012 |
| EP | 2 308 923 B1 | 5/2012 |
| EP | 2 532 687 A2 | 12/2012 |
| EP | 2 546 298 A1 | 1/2013 |
| EP | 2 551 299 A1 | 1/2013 |
| EP | 2 565 221 A1 | 3/2013 |
| EP | 2 573 134 A1 | 3/2013 |
| EP | 2 592 112 A1 | 5/2013 |
| EP | 2 610 270 A1 | 7/2013 |
| EP | 2 610 271 A1 | 7/2013 |
| EP | 2 610 272 A1 | 7/2013 |
| EP | 2 610 273 A1 | 7/2013 |
| EP | 2 666 818 A1 | 11/2013 |
| JP | 2008-511703 A | 4/2008 |
| WO | WO 1987/007620 A1 | 12/1987 |
| WO | WO 1992/012182 A1 | 7/1992 |
| WO | WO 1992/013029 A1 | 8/1992 |
| WO | WO 1992/019653 A1 | 11/1992 |
| WO | WO 1992/019658 A1 | 11/1992 |
| WO | WO 1992/019659 A1 | 11/1992 |
| WO | WO 1992/021705 A1 | 12/1992 |
| WO | WO 1993/011165 A1 | 6/1993 |
| WO | WO 1993/011166 A1 | 6/1993 |
| WO | WO 1993/019100 A1 | 9/1993 |
| WO | WO 1994/010180 A1 | 5/1994 |
| WO | WO 1994/014856 A1 | 7/1994 |
| WO | WO 1995/012622 A1 | 5/1995 |
| WO | WO 1995/032994 A1 | 12/1995 |
| WO | WO 1997/010248 A1 | 3/1997 |
| WO | WO 1997/014700 A1 | 4/1997 |
| WO | WO 1997/028170 A1 | 8/1997 |
| WO | WO 1997/036939 A1 | 10/1997 |
| WO | WO 1998/012234 A1 | 3/1998 |
| WO | WO 1998/016359 A1 | 4/1998 |
| WO | WO 1998/038041 A1 | 9/1998 |
| WO | WO 1998/040331 A1 | 9/1998 |
| WO | WO 1998/046616 A1 | 10/1998 |
| WO | WO 1998/047929 A1 | 10/1998 |
| WO | WO 1998/049208 A1 | 11/1998 |
| WO | WO 1998/056831 A1 | 12/1998 |
| WO | WO 1998/058971 A1 | 12/1998 |
| WO | WO 1998/058976 A1 | 12/1998 |
| WO | WO 1998/058977 A1 | 12/1998 |
| WO | WO 1999/010353 A1 | 3/1999 |
| WO | WO 1999/012981 A1 | 3/1999 |
| WO | WO 1999/019335 A1 | 4/1999 |
| WO | WO 1999/024478 A1 | 5/1999 |
| WO | WO 1999/024479 A1 | 5/1999 |
| WO | WO 1999/033842 A1 | 7/1999 |
| WO | WO 1999/041290 A1 | 8/1999 |
| WO | WO 2000/034341 A2 | 6/2000 |
| WO | WO 2000/068315 A1 | 11/2000 |
| WO | WO 2001/048034 A2 | 7/2001 |
| WO | WO 2001/058970 A1 | 8/2001 |
| WO | WO 2001/070395 A2 | 9/2001 |
| WO | WO 2002/002576 A1 | 1/2002 |
| WO | WO 2002/051912 A1 | 7/2002 |
| WO | WO 2002/057342 A2 | 7/2002 |
| WO | WO 2003/000754 A1 | 1/2003 |
| WO | WO 2003/000755 A2 | 1/2003 |
| WO | WO 2003/000756 A1 | 1/2003 |
| WO | WO 2003/000757 A1 | 1/2003 |
| WO | WO 2003/051934 A2 | 6/2003 |
| WO | WO 2003/054035 A1 | 7/2003 |
| WO | WO 2003/066698 A1 | 8/2003 |
| WO | WO 2003/082879 A1 | 10/2003 |
| WO | WO 2004/000899 A1 | 12/2003 |
| WO | WO 2004/013193 A2 | 2/2004 |
| WO | WO 2004/029112 A1 | 4/2004 |
| WO | WO 2004/111095 A1 | 12/2004 |
| WO | WO 2005/066247 A1 | 7/2005 |
| WO | WO 2005/105863 A2 | 11/2005 |
| WO | WO 2006/069733 A1 | 7/2006 |
| WO | WO 2006/086134 A1 | 8/2006 |
| WO | WO 2006/097497 A1 | 9/2006 |
| WO | WO 2007/077027 A1 | 7/2007 |
| WO | WO 2007/107448 A1 | 9/2007 |
| WO | WO 2007/116034 A1 | 10/2007 |
| WO | WO 2007/122239 A1 | 11/2007 |
| WO | WO 2007/137853 A1 | 12/2007 |
| WO | WO 2008/034630 A1 | 3/2008 |
| WO | WO 2008/074713 A1 | 6/2008 |
| WO | WO 2008/132035 A1 | 11/2008 |
| WO | WO 2009/019169 A1 | 2/2009 |
| WO | WO 2009/027075 A2 | 3/2009 |
| WO | WO 2009/054832 A1 | 4/2009 |
| WO | WO 2009/063819 A1 | 5/2009 |

(56) References Cited

FOREIGN PATENT DOCUMENTS

| | | |
|---|---|---|
| WO | WO 2009/077287 A1 | 6/2009 |
| WO | WO 2010/009827 A1 | 1/2010 |
| WO | WO 2010/039715 A1 | 4/2010 |
| WO | WO 2010/052260 A1 | 5/2010 |
| WO | WO 2010/053644 A1 | 5/2010 |
| WO | WO 2010/082943 A1 | 7/2010 |
| WO | WO 2010/142540 A1 | 12/2010 |
| WO | WO 2011/023594 A1 | 3/2011 |
| WO | WO 2011/039305 A1 | 4/2011 |
| WO | WO 2011/135004 A2 | 11/2011 |
| WO | WO 2011/135005 A2 | 11/2011 |
| WO | WO 2011/138211 A1 | 11/2011 |
| WO | WO 2011/141380 A1 | 11/2011 |
| WO | WO 2011/144703 A1 | 11/2011 |
| WO | WO 2011/160936 A1 | 12/2011 |
| WO | WO 2012/001052 A2 | 1/2012 |
| WO | WO 2012/007430 A1 | 1/2012 |
| WO | WO 2012/093098 A1 | 7/2012 |
| WO | WO 2013/004507 A1 | 1/2013 |
| WO | WO 2013/007650 A1 | 1/2013 |
| WO | WO 2013/010879 A1 | 1/2013 |
| WO | WO 2013/050119 A1 | 4/2013 |
| WO | WO 2013/092615 A1 | 6/2013 |
| WO | WO 2013/092620 A1 | 6/2013 |
| WO | WO 2013/127707 A1 | 9/2013 |
| WO | WO 2014/023603 A1 | 2/2014 |
| WO | WO 2014/023604 A1 | 2/2014 |
| WO | WO 2015/022127 A1 | 2/2015 |
| WO | WO 2015/024887 A1 | 2/2015 |
| WO | WO 2015/024891 A1 | 2/2015 |
| WO | WO 2015/044116 A1 | 4/2015 |
| WO | WO 2015/052246 A1 | 4/2015 |
| WO | WO 2015/059229 A1 | 4/2015 |
| WO | WO 2015/059230 A1 | 4/2015 |
| WO | WO 2015/062936 A1 | 5/2015 |
| WO | WO 2015/075088 A1 | 5/2015 |
| WO | WO 2015/082379 A1 | 6/2015 |
| WO | WO 2015/091660 A1 | 6/2015 |
| WO | WO 2015/091829 A1 | 6/2015 |
| WO | WO 2015/091839 A1 | 6/2015 |
| WO | WO 2015/101593 A1 | 7/2015 |
| WO | WO 2015/107020 A1 | 7/2015 |
| WO | WO 2015/113907 A1 | 8/2015 |
| WO | WO 2015/117948 A1 | 8/2015 |
| WO | WO 2015/117958 A1 | 8/2015 |
| WO | WO 2015/121160 A1 | 8/2015 |

OTHER PUBLICATIONS

"Glossary of Basic Terms in Polymer Science (IUPAC Recommendations 1996)," *Pure Appl. Chem.*, 68(8):1591-1595 (1996).
"MDO Film—Oriented PE and PP packaging film," IN0128/GB FF 2004 10, Borealis A/S (2004).
Abiru et al., "Microstructural Characterization of Propylene-Butene-1 Copolymer Using Temperature Rising elution Fractionation," *J. Appl. Polymer Sci* 68:1493-1501 (1998).
Atwood, "Chapter 6: Anionic and Cationic Organoaluminum Compounds," *Coord. Chem. Alum.*, VCH, New York, NY, pp. 197-232 (1993).
Britovsek et ai., "The Search for New-Generation Olefin Polymerization Catalysts: Life beyond Metallocenes," *Angew. Chem, Int Ed.*, vol. 38(4), pp. 428-447 (1999).
Busico et al., "Alk-1-ene Polymerization in the Presence of a Monocyclopentadienyl Zirconium(IV) Acetamidinate Catalyst: Microstructural and Mechanistic Insights," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).

Castignolles et al., "Detection and quantification of branching in polyacrylates by size-exclusion chromatography (SEC) and melt-state $^{13}$C NMR spectroscopy," *Polymer*, 50(11):2373-2383, (2009).
Cheng, "$^{13}$C NMR Analysis of Ethylene-Propylene Rubbers," *Macromolecules* 17:1950-1955 (1984).
Cimmino et al., "Thermal and mechanical properties of isotactic random propylene-butene-1 copolymers," *Polymer* 19:1222-1223 (1978).
Crispino et al., "Influence of Composition on the Melt Crystallization of Isotactic Random Propylene/1-Butene Copolymers," *Makromol. Chem.* 181:1747-1755 (1980).
Filip et al., "Heteronuclear decoupling under fast MAS by a rotor-synchronized Hahn-echo pulse train,"*J. Magnet. Reson.* 176:239-243 (2005).
Fujiyama et al., "Effect of Molecular Parameters on the Shrinkage of Injection-Molded Polypropylene," *J. Appl. Polym. Sci.* 22:1225-1241 (1978).
Gahleitner et al., "Nucleation of Polypropylene Homo- and Copolymers," *International Polymer Processing* 26(1):2-20 (2011).
Galli et al., "Technology: driving force behind innovation and growth of polyolefins," *Prog. Polym. Sci.* 26:1287-1336 (2001).
Grein et al., "Impact Modified Isotatic Polypropylene with Controlled Rubber Intrinsic Viscosities: Some New Aspects About Morphology and Fracture," *J. Appl. Polymer Sci.*, 87:1702-1712 (2003).
Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198—S208 (2007).
Holbrey et al., "Liquid clathrate formation in ionic liquid-aromatic mixtures," *Chem. Comm.*, 2003, pp. 476-477.
Kakugo et al., "$^{13}$C NMR Determination of Monomer Sequence Distribution in Ethylene-Propylene Copolymers Prepared with δ-TiCl$_3$—Al(C$_2$H$_5$)$_2$Cl," *Macromolecules* 15:1150-1152 (1982).
Klimke et al., "Optimisation and Application of Polyolefin Branch Quantification by Melt-State $^{13}$C NMR Spectroscopy," *Macromol. Chem. Phys.* 207(4):382-395 (2006).
McAuley et al., "On-line Inference of Polymer Properties in an Industrial Polyethylene Reactor," *AIChE Journal*, vol. 37, No, 6, pp. 825-835 (1991).
Myhre et al., "Oriented PE films—Expanding Opportunities with Borstar® PE," Maack Speciality Films, pp. 1-10 (2001).
Parkinson et al., "Effect of Branch Length on $^{13}$C NMR Relaxation Properties in Molten Poly[ethylene-co-(α-olefin)] Model Systems," *Macromol. Chem. Phys.* 208(19-20):2128-2133 (2007).
.Periodic Table (IUPAC 2007).
*Plastics Additives Handbook*, 5th edition, Hans Zweifel, Editor, Hanser Publishers, Munich, pp. 871-873 (2001).
*Plastics Additives Handbook*, 5th edition, Hans Zweifel, Editor, Hanser Publishers, Munich, pp. 956-965 (2001).
Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).
*Propylene Handbook*, 2$^{nd}$ Edition, Chapter 7.2.2 "Oriented Films," pp. 405-415, Nello Pasquini, Editor, Hanser (2005).
Randall, "A Review of High Resolution Liquid $^{13}$Carbon Nuclear Magnetic Resonance Characterizations of Ethylene-Based Polymers," *JMS-Rev. Macromol. Chem. Phys.*, C29(2 & 3):201-317 (1989).
Resconi et al., "Diastereoselective Synthesis, Molecular Structure, and Solution Dynamics of meso- and rac-[Ethylenebis(4,7-dimethyl-η5-1-indenyl)]zirconium Dichloride Isomers and Chain Transfer Reactions in Propene Polymerization with the rac Isomer," *Organometallics* 15(23):5046-5059 (1996).
Resconi et al., "Highly Regiospecific Zirconocene Catalysts for the Isospecific Polymerization of Propene," *JACS* 120(10):2308-2321 (1998).
Resconi et al., "Selectivity in Propene Polymerization with Metallocene Catalysts," *Chem. Rev.* 100(4):1253-1345 (2000).
Singh et al., "Triad sequence determination of ethylene-propylene copolymers—application of quantitative $^{13}$C NMR," *Polymer Testing* 28(5):475-479 (2009).

(56) References Cited

OTHER PUBLICATIONS

Spaleck et al., "The Influence of Aromatic Substituents on the Polymerization Behavior of Bridged Zirconocene Catalysts," *Organometallics* 13:954-963 (1994).
Spear et al., "Liquid Clathrates," *Encyclopedia of Supramolecular Chemistry*, J.L. Atwood and J.W. Steed (Eds.); Marcel Dekker: New York, pp. 804-808 (2004).
Wang et al., "Structural Analysis of Ethylene/Propylene Copolymers Synthesized with a Constrained Geometry Catalyst," *Macromolecules* 33:1157-1162 (2000).
Zhou et al., "A new decoupling method for accurate quantification of polyethylene copolymer composition and triad sequence distribution with $^{13}$C NMR," *J. Magnet. Reson.* 187:225-233 (2007).
"Polyethylene Lumicene® mPE M5510 EP," Total Refining & Chemicals, Total Ecosolutions, Belgium, Aug. 2013 (2 pgs.).
European Patent Office, International Search Report in International Application No. PCT/EP2014/067543 (dated Oct. 13, 2014).
European Patent Office, Written Opinion in International Application No. PCT/EP2014/067543 (dated Oct. 13, 2014).
European Patent Office, International Preliminary Report on Patentability in International Application No. PCT/EP2014/067543 (dated Feb. 23, 2016).
European Patent Office, Extended European Search Report in European Patent Application No. 13181225.7 (dated Feb. 7, 2014).

\* cited by examiner

HIGH FLOW POLYOLEFIN COMPOSITION WITH HIGH STIFFNESS AND TOUGHNESS

CROSS-REFERENCE TO RELATED APPLICATIONS

This patent application is the U.S. national phase of International Application No. PCT/EP2014/067543, filed on Aug. 18, 2014, which claims the benefit of European Patent Application No. 13181225.7, filed Aug. 21, 2013, the disclosures of which are incorporated herein by reference in their entireties for all purposes.

The present invention is directed to a polyolefin composition having improved properties such as an excellent balance of stiffness and toughness. The polyolefin composition according to the present invention comprises a mixture of two defined heterophasic propylene copolymers.

Polypropylene is the material of choice in many applications as it can be tailored to specific purposes needed. For instance heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a propylene copolymer rubber, like an ethylene propylene rubber (EPR) or an ethylene propylene diene monomer polymer (EPDM). Further the heterophasic polypropylene contains a crystalline polyethylene to some extent. In the automobile industry such heterophasic polypropylene grades contain an amount of about 30 wt.-% propylene copolymer rubber, which normally is produced directly in one or two gas phase reactors or added externally to the matrix via a compounding step.

Automotive parts are increasingly produced by means of injection moulding. Injection moulding or big automotive parts, like bumpers, body panels or dashboards, require polymers having a sufficiently low viscosity (i.e. a sufficiently high melt flow rate) but still acceptable and balance mechanical performance. However, polymers of higher melt flow rate (i.e. higher flowability) usually exhibit a lower molecular weight and thus inferior mechanical properties. The reduction in molecular weight does not only reduce the viscosity and increase the flowability but also alters or deteriorates the mechanical properties such as toughness. Hence, polymeric compositions exhibiting a combination of high flowability and excellent mechanical properties are not trivial to provide.

SUMMARY OF THE INVENTION

The object of the present invention is the provision of a polyolefin composition having high flowability in addition to excellent mechanical properties, so that the composition can be employed for the production of automotive parts, in particular big automotive parts, using e.g. injection moulding.

The inventors of the present invention have found that the above object can be attained by combining two different heterophasic propylene copolymers having defined characteristics.

Thus, the present invention provides a polyolefin composition comprising (a) a first heterophasic propylene copolymer (HECO1) having
  (i) a melt flow rate $MFR_2$ (230° C.) measured according to ISO 1133 in the range of 15.0 to 55.0 g/10 min, and
  (ii) a xylene cold soluble content (XCS) determined according ISO 16152 (25° C.) in the range of 24 to 38 wt.-%,
  wherein further
  (iii) the intrinsic viscosity (IV) determined according to DIN ISO 1628/1 (in decalin at 135° C.) of the xylene cold soluble (XCS) fraction of the heterophasic propylene copolymer (HECO1) is in the range of 2.0 to 3.5 dl/g, like in the range of 2.0 to 2.8 dl/g, and (b) a second heterophasic propylene copolymer (HECO2) having
  (i) a melt flow rate $MFR_2$ (230° C.) measured according to ISO 1133 in the range of 0.5 to 8.0 g/10 min, and
  (ii) a xylene cold soluble content (XCS) determined according ISO 16152 (25° C.) in the range of 33 to 55 wt.-%,
  wherein further
  (iii) the intrinsic viscosity (IV) determined according to DIN ISO 1628/1 (in decalin at 135° C.) of the xylene cold soluble (XCS) fraction of the heterophasic propylene copolymer (HECO2) is in the range of 1.5 to 2.6 dl/g.

Further preferred embodiments of the present invention are described in the attached dependent claims.

DETAILED DESCRIPTION

The mentioned above, the polyolefin composition according to the present invention comprises two specific heterophasic propylene copolymers.

The expression "heterophasic propylene copolymer" or "heterophasic" as used in the instant invention indicates that an elastomeric propylene copolymer is (finely) dispersed in a (semi)crystalline polypropylene. In other words the (semi) crystalline polypropylene constitutes a matrix in which the elastomeric propylene copolymer forms inclusions in the matrix, i.e. in the (semi)crystalline polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or scanning force microscopy.

The first heterophasic propylene copolymer (HECO1) and the second heterophasic propylene copolymer (HECO2) as employed according to the present invention are described in further detail below.

First Heterophasic Propylene Copolymer (HECO1)

As stated above, the polyolefin composition according to the present invention comprises a first heterophasic propylene copolymer (HECO1) as an essential component. It is preferred that the first heterophasic propylene copolymer (HECO1) before mixed with the other components mentioned herein comprises as polymer components only the matrix polypropylene (PP1) and dispersed therein the elastomeric propylene copolymer (E1). In other words the first heterophasic propylene copolymer (HECO1) may contain further additives but no other polymer in an amount exceeding 5 wt-%, more preferably exceeding 3 wt.-%, like exceeding 1 wt.-%, based on the total amount of the first heterophasic propylene copolymer (HECO1), more preferably based on the polymers present in the first heterophasic propylene copolymer (HECO1). One additional polymer which may be present in such low amounts is a polyethylene which is a reaction product obtained by the preparation of the first heterophasic propylene copolymer (HECO1). Accordingly it is in particular appreciated that a first heterophasic propylene copolymer (HECO1) as defined in the instant invention contains only a polypropylene (PP1), an elastomeric propylene copolymer (E1) and optionally a polyethylene in amounts as mentioned in this paragraph.

One important aspect of the instant invention is that the first heterophasic propylene copolymer (HECO1) has a rather high melt flow rate, i.e. has a melt flow rate $MFR_2$ (230° C.) of at least 15.0 g/10 min, more preferably in the range of 15.0 to 55.0 g/10 min, yet more preferably in the range of 20.0 to 50.0 g/10 min, still more preferably in the range of 20.0 to 45.0 g/10 min.

Preferably it is desired that the first heterophasic propylene copolymer (HECO1) is thermo mechanically stable. Accordingly it is appreciated that the first heterophasic propylene copolymer (HECO1) has a melting temperature ($T_m$) of at least 135° C., more preferably in the range of 135 to 168° C.

Preferably the propylene content in the heterophasic propylene copolymer (HECO1) is 83.0 to 94.0 wt.-%, more preferably 85.0 to 93.0 wt.-%, based on the total amount of the first heterophasic propylene copolymer (HECO1), more preferably based on the amount of the polymer components of the first heterophasic propylene copolymer (HECO1), yet more preferably based on the amount of the polypropylene (PP1) and the elastomeric propylene copolymer (E1) together. The remaining part constitutes the comonomers as defined for the polypropylene (PP1) being a propylene copolymer (R-PP1) and the elastomeric propylene copolymer (E1), respectively, preferably ethylene. Accordingly the comonomer content, preferably ethylene content is in the range of 6.0 to 17.0 wt.-%, more preferably in the range of 7.0 to 15.0 wt.-%.

As stated above the matrix of the first heterophasic propylene copolymer (HECO1) is the polypropylene (PP1).

The polypropylene (PP1) according to this invention constituting the matrix of the first heterophasic copolymer (HECO1) shall have a melt flow rate $MFR_2$ (230° C.) of 60 to 400 g/10 min, preferably in the range of 100 to 350 g/10 min, more preferably in the range of 150 to 300 g/10 min.

The polypropylene (PP1) can be a propylene copolymer (R-PP1) or a propylene homopolymer (H-PP1), the latter is preferred.

Accordingly it is appreciated that the polypropylene (PP1) has a comonomer content equal or below 9.0 wt.-%, more preferably equal or below 7.0 wt.-%, still more preferably equal or below 4.0 wt.-%.

The expression propylene homopolymer used in the instant invention relates to a polypropylene that consists substantially, i.e. of equal or more than 99.0 wt.-%, such as at least 99.3 wt.-%, still more preferably of at least 99.5 wt.-%, like of at least 99.8 wt.-%, of propylene units. In case other monomeric units are present in minor amounts, the units are selected from ethylene and/or a $C_4$ to $C_{12}$ α-olefin as described below. In a preferred embodiment only propylene units in the propylene homopolymer are detectable.

In case the polypropylene (PP1) is a propylene copolymer (R-PP1) it comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the propylene copolymer (R-PP1) comprises, especially consists of, monomers copolymerizable with propylene from the group consisting of ethylene, 1-butene and 1-hexene. More specifically the propylene copolymer (R-PP1) comprises—apart from propylene—units derivable from ethylene and/or 1-butene. In a preferred embodiment the propylene copolymer (R-PP1) comprises units derivable from ethylene and propylene only. The comonomer content in the propylene copolymer (R-PP1) is preferably in the range of more than 1.0 to 9.0 wt.-%, still more preferably in the range of more than 1.0 to 7.0 wt.-%.

The polypropylene (PP1) can have a xylene cold soluble content (XCS) in a broad range, i.e. up to 5.0 wt.-%. Accordingly the polypropylene (PP1) may have a xylene cold soluble content (XCS) in the range of 0.3 to 5.0 wt.-%, like 0.5 to 4.5 wt.-%.

However in preferred embodiments the polypropylene (PP1), in particular in case the polypropylene (PP1) is a propylene homopolymer (H-PP1), has a xylene cold soluble (XCS) content in the range of 0.5 to 5.0 wt.-%, more preferably in the range of 1.0 to 4.0 wt.-%, still more preferably of 1.5 to 3.5 wt.-%.

One further essential component of the first heterophasic propylene copolymer (HECO1) is its elastomeric propylene copolymer (E1).

The elastomeric propylene copolymer (E1) preferably comprises monomers copolymerizable with propylene, for example comonomers such as ethylene and/or $C_4$ to $C_{12}$ α-olefins, in particular ethylene and/or $C_4$ to $C_{10}$ α-olefins, e.g. 1-butene and/or 1-hexene. Preferably the elastomeric propylene copolymer (E1) comprises, especially consists of, monomers copolymerizable with propylene from the group consisting of ethylene, 1-butene and 1-hexene. More specifically the elastomeric propylene copolymer (E1) comprises—apart from propylene—units derivable from ethylene and/or 1-butene. Thus in an especially preferred embodiment the elastomeric propylene copolymer phase (E1) comprises units derivable from ethylene and propylene only.

In case the polypropylene (PP1) is a propylene copolymer (R-PP1) it is preferred that the comonomer(s) of the propylene copolymer (R-PP1) and the elastomeric propylene copolymer (E1) are the same.

The properties of the elastomeric propylene copolymer phase (E1) mainly influence the xylene cold soluble (XCS) content of the first heterophasic propylene copolymer (HECO1). Thus according to the present invention the xylene cold soluble (XCS) fraction of the first heterophasic propylene copolymer (HECO1) is regarded as the elastomeric propylene copolymer (E1) of the first heterophasic propylene copolymer (HECO1).

Accordingly, the amount of the elastomeric propylene copolymer (E1), i.e. of the xylene cold soluble (XCS) fraction, of the first heterophasic propylene copolymer (HECO1) preferably is in the range of 24 to 38 wt.-%, more preferably in the range of 25 to 37 wt.-%, still more preferably in the range of 26 to 36 wt.-%. These values are based on the first heterophasic propylene copolymer (HECO1) and not on the total polyolefin composition.

One important requirement of the present invention is that the elastomeric propylene copolymer (E1) has a balanced weight average molecular weight. Small particles are formed in case the matrix and the elastomeric phase have similar molecular weight. Small particles are generally preferred, because this improves the overall properties of the heterophasic system. However, in the instant invention the matrix has by trend a high melt flow rate and thus a rather low weight average molecular weight. Accordingly also the elastomeric propylene copolymer (E1) should have a low weight average molecular weight in order to obtain small particles. On the other hand this would mean in the present case a severe reduction in low weight average molecular weight for the elastomeric propylene copolymer (E1), which has negative impact on the mechanical properties. Accordingly the intrinsic viscosity must be carefully chosen.

Low intrinsic viscosity (IV) values reflect a low weight average molecular weight. Thus it is appreciated that the elastomeric propylene copolymer phase (E1), i.e. the xylene cold soluble fraction (XCS) of the first heterophasic propylene copolymer (HECO1), has an intrinsic viscosity (IV) determined according to DIN ISO 1628/1 (in decaline at 135° C.) in the range of 2.0 to 3.5 dl/g, like in the range of 2.0 to 2.8 dl/g, more preferably in the range of equal or more than 2.1 to 3.2 dl/g, still more preferably in the range of equal or more than 2.3 to 3.0 dl/g.

The comonomer content, preferably the ethylene content, within the elastomeric propylene copolymer phase (E1) shall be preferably also in a specific range. Accordingly in a preferred embodiment the comonomer content, more preferably ethylene content, of the elastomeric propylene copolymer (E1), i.e. of the xylene cold soluble fraction (XCS) of the first heterophasic propylene copolymer (HECO1), is in the range of 26 to 40 wt.-%, still more preferably in the range of 28 to 38 wt.-%, yet more preferably in the range of 31 to 38 wt.-%

Accordingly it is appreciated that the propylene content of the elastomeric propylene copolymer (E1), i.e. of the xylene cold soluble fraction (XCS) of the first heterophasic propylene copolymer (HECO1), is preferably in the range of 60 to 74 wt.-%, still more preferably in the range of 62 to 72 wt-%, yet more preferably in the range of 62 to 69 wt.-%.

As will be explained below, the first heterophasic polypropylene (HECO1) as well its individual components (matrix and elastomeric copolymer) can be produced by blending different polymer types, i.e. of different molecular weight and/or comonomer content. However it is preferred that the first heterophasic polypropylene (HECO1) as well its individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

The first heterophasic propylene copolymer (HECO1) according to this invention is preferably produced in a sequential polymerization process, i.e. in a multistage process, known in the art, wherein the polypropylene (PP1) is produced at least in one slurry reactor, preferably in a slurry reactor and optionally in a subsequent gas phase reactor, and subsequently the elastomeric propylene copolymer (E1) is produced at least in one, i.e. one or two, gas phase reactor(s).

Accordingly it is preferred that the first heterophasic propylene copolymer (HECO1) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the polypropylene (PP1), preferably said first polypropylene fraction is a first propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the polypropylene (PP1), i.e. the matrix of the heterophasic propylene copolymer (HECO1),
(d) transferring the polypropylene (PP1) of step (c) into a third reactor (R3),
(e) polymerizing in the third reactor (R3) and in the presence of the polypropylene (PP1) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the polypropylene (PP1),
(f) transferring the polypropylene (PP1) in which the first elastomeric propylene copolymer fraction is dispersed in a fourth reactor (R4), and
(g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the polypropylene (PP1), the first elastomeric propylene copolymer fraction, and the second elastomeric propylene copolymer fraction form the heterophasic propylene copolymer (HECO1).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the first heterophasic propylene copolymer (HECO1) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2), the third reactor (R3) and the fourth reactor (R4) are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
  the temperature is within the range of 50° C. to 110° C., preferably between 60° C. and 100° C., more preferably between 68 and 95° C.,
  the pressure is within the range of 20 bar to 80 bar, preferably between 40 bar to 70 bar,
  hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
  the temperature is within the range of 50° C. to 130° C., preferably between 60° C. and 100° C.,
  the pressure is within the range of 5 bar to 50 bar, preferably between 15 bar to 35 bar,
  hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the first heterophasic propylene copolymer (HECO1) is obtained by a multistage polymerization process, as described above, in the presence of a catalyst system comprising as component (i) a Ziegler-Natta procatalyst which contains a transesterification product of a lower alcohol and a phthalic ester.

The procatalyst used according to the invention for preparing the first heterophasic propylene copolymer (HECO1) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

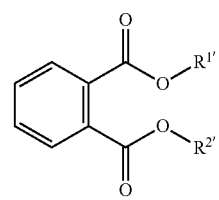

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl and n is 1 to 6, is contacting with $TiCl_4$ to form a titanized carrier, followed by the steps of
  adding to said titanised carrier
    (i) a dialkylphthalate of formula (I) with $R^{1'}$ and $R^{2'}$ being independently at least a $C_5$-alkyl, like at least a $C_8$-alkyl, or preferably
  (ii) a dialkylphthalate of formula (I) with $R^{1'}$ and $R^{2'}$ being the same and being at least a $C_5$-alkyl, like at least a $C_8$-alkyl,
or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

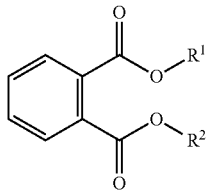

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2(cyclo-pentyl)_2$] or diisopropyl dimethoxy silane [$Si(OCH_3)_2(CH(CH_3)_2)_2$].

Most preferably the external donor of formula (IIIb) is diethylaminotriethoxysilane.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

Accordingly it is appreciated that the first heterophasic propylene copolymer (HECO1) is α-nucleated. In case the α-nucleation is not effected by a vinylcycloalkane polymer or a vinylalkane polymer as indicated above, the following α-nucleating agents may be present
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6-di-tert-butylphenyl) phosphate or aluminium-hydroxy-bis[2,2'-methylene-bis(4,6-di-t-butylphenyl)phosphate], and
(iv) mixtures thereof.

Second Heterophasic Propylene Copolymer (HECO2)

As mentioned above, the polyolefin composition according to the present invention further comprises a second heterophasic propylene copolymer (HECO2) as an essential component.

The second heterophasic propylene copolymer (HECO2) has a lower melt flow rate $MFR_2$ than the first heterophasic propylene copolymer (HECO1). Furthermore, the cold xylene soluble content (XCS) of the second heterophasic propylene copolymer (HECO2) should preferably be higher than in the first heterophasic propylene copolymer (HECO1), while the intrinsic viscosity (IV) of the xylene cold soluble (XCS) fraction of the second heterophasic propylene copolymer (HECO2) should be lower than in the first heterophasic propylene copolymer (HECO1).

Accordingly it is preferred that the ratio of the melt flow rate $MFR_2$ (230° C.) of the first heterophasic propylene copolymer (HECO1) to the second heterophasic propylene copolymer (HECO2) fulfills the in-equation (I), more preferably in-equation (Ia), still more preferably in-equation (Ib), yet more preferably in-equation (Ic)

$$\frac{MFR\,(1)}{MFR\,(2)} \geq 5, \quad (I)$$

$$5 \leq \frac{MFR\,(1)}{MFR\,(2)} \leq 50, \quad (Ia)$$

$$6 \leq \frac{MFR\,(1)}{MFR\,(2)} \leq 40, \quad (Ib)$$

$$8 \leq \frac{MFR\,(1)}{MFR\,(2)} \leq 30, \quad (Ic)$$

wherein
MFR (1) is the melt flow rate $MFR_2$ (230° C.) of the first heterophasic propylene copolymer (HECO1) and
MFR (2) is the melt flow rate $MFR_2$ (230° C.) of the second heterophasic propylene copolymer (HECO2).

Additionally or alternatively the ratio of the cold xylene soluble content (XCS) of the second heterophasic propylene copolymer (HECO2) to the cold xylene soluble content (XCS) of the first heterophasic propylene copolymer (HECO1) fulfills the in-equation (II), more preferably in-equation (IIa), still more preferably in-equation (IIb), yet more preferably in-equation (IIc)

$$\frac{XCS\,(2)}{XCS\,(1)} \geq 1.0, \quad (II)$$

$$1.0 \leq \frac{XCS\,(2)}{XCS\,(1)} \leq 2.2, \quad (IIa)$$

$$1.1 \leq \frac{XCS\,(2)}{XCS\,(1)} \leq 2.0, \quad (IIb)$$

$$1.1 \leq \frac{XCS\,(2)}{XCS\,(1)} \leq 1.9, \quad (IIc)$$

wherein
XCS (1) is the cold xylene soluble content (XCS) of the first heterophasic propylene copolymer (HECO1) and
XCS (2) is the cold xylene soluble content (XCS) of the second heterophasic propylene copolymer (HECO2).

In one further embodiment it is preferred that the ratio of the intrinsic viscosity (IV) of the cold xylene soluble content (XCS) of the first heterophasic propylene copolymer (HECO1) to the intrinsic viscosity (IV) of the cold xylene soluble content (XCS) of the second heterophasic propylene copolymer (HECO2) fulfills the in-equation (III), more preferably in-equation (IIIa), still more preferably in-equation (IIIb), yet more preferably in-equation (IIIc)

$$\frac{IV\,(1)}{IV\,(2)} > 1.0, \quad (III)$$

$$1.0 < \frac{IV\,(1)}{IV\,(2)} \leq 1.9, \quad (IIIa)$$

$$1.1 < \frac{IV\,(1)}{IV\,(2)} \leq 1.8, \quad (IIIb)$$

$$1.3 \leq \frac{IV\,(1)}{IV\,(2)} \leq 1.7, \quad (IIIc)$$

wherein
IV (1) is the intrinsic viscosity (IV) of the cold xylene soluble content (XCS) of the first heterophasic propylene copolymer (HECO1) and
IV (2) is the intrinsic viscosity (IV) of the cold xylene soluble content (XCS) of the second heterophasic propylene copolymer (HECO2).

The second heterophasic propylene copolymer (HECO2) comprises as polymer components only a propylene copolymer (R-PP2) as matrix and dispersed therein an elastomeric propylene copolymer (E2). In other words the second heterophasic propylene copolymer (HECO2) may contain further additives but no other polymer in an amount exceeding 5 wt.-%, more preferably exceeding 3 wt.-%, like exceeding 1 wt.-%, based on the total amount of the second heterophasic propylene copolymer (HECO2), more preferably based on the polymers present in the second heterophasic propylene copolymer (HECO2). One additional polymer which may be present in such low amounts is a polyethylene which is a reaction product obtained by the preparation of the second heterophasic propylene copolymer (HECO2). Accordingly it is in particular appreciated that the second heterophasic propylene copolymer (HECO2) as defined in the instant invention contains only the propylene copolymer (R-PP2), the elastomeric propylene copolymer (E2) and optionally a polyethylene in amounts as mentioned in this paragraph.

The second heterophasic propylene copolymer (HECO2) according to this invention is further featured by a rather low melt flow rate $MFR_2$ (230° C.). Accordingly the second heterophasic propylene copolymer (HECO2) has a melt flow rate $MFR_2$ (230° C.) measured according to ISO 1133 in the range of more than 0.5 to 8.0 g/10 min, more preferably in the range of more than 1.0 to 6.0 g/10 min, still more preferably in the range of 1.0 to 5.0 g/10 min.

Preferably it is desired that the second heterophasic propylene copolymer (HECO2) is thermo mechanically stable. Accordingly it is appreciated that the second heterophasic propylene copolymer (HECO2) has a melting temperature of at least 140° C., more preferably in the range of 140 to 155° C., still more preferably in the range of 143 to 152° C., like in the range of 145 to 150° C.

Preferably the propylene content in the second heterophasic propylene copolymer (HECO2) is 70.0 to 90.0 wt.-%, more preferably 80.0 to 90.0 wt.-%, based on the total amount of the second heterophasic propylene copolymer (HECO2), more preferably based on the amount of the polymer components of the second heterophasic propylene copolymer (HECO2), yet more preferably based on the amount of the propylene copolymer (R-PP2) and the elastomeric propylene copolymer (E2) together. The remaining part constitutes the comonomers as defined for the propylene copolymer (R-PP1) and the elastomeric propylene copolymer (E1), respectively, preferably ethylene. Accordingly the comonomer content, preferably ethylene content, is in the range of 10.0 to 30.0 wt.-%, more preferably in the range of 10.0 to 20.0 wt.-%.

The second heterophasic propylene copolymer (HECO2) of the instant invention can be further defined by the amount of comonomers within the xylene cold soluble (XCS) fraction. Accordingly, it is preferred that the comonomer content in the xylene cold soluble fraction (XCS) of the second heterophasic propylene copolymer (HECO2) is rather moderate. Thus it is appreciated that the comonomer content of the xylene cold soluble fraction (XCS) of the second heterophasic propylene copolymer (HECO2) is in the range of 10 to 30 wt.-%, yet more preferably in the range of 12 to 28 wt.-%, still more preferably in the range of 15 to 25 wt.-%.

Concerning the comonomers present in the xylene cold soluble fraction (XCS) of the second heterophasic propylene copolymer (HECO2), it is referred to the information provided for the propylene copolymer (R-PP2) and the elastomeric propylene copolymer (E2). Accordingly in a specific embodiment the xylene cold soluble fraction (XCS) of the second heterophasic propylene copolymer (HECO2) comprises, especially consists of, monomers copolymerizable with propylene from the group consisting of ethylene, 1-butene and 1-hexene. More specifically the xylene cold soluble fraction (XCS) comprises—apart from propylene—units derivable from ethylene and/or 1-butene. In a preferred embodiment the xylene cold soluble fraction (XCS) comprises units derivable from ethylene and propylene only.

Considering the information provided above, it is preferred that the second heterophasic propylene copolymer (HECO2) fulfills inequation (IV), more preferably inequation (IVa), yet more preferably inequation (IVb), still more preferably inequation (IVc), $$\frac{Co\ (\text{total})}{Co\ (XCS)} \geq 0.4, \tag{IV}$$

$$\frac{Co\ (\text{total})}{Co\ (XCS)} \geq 0.5, \tag{IVa}$$

$$0.5 \geq \frac{Co\ (\text{total})}{Co\ (XCS)} \geq 1.1, \tag{IVb}$$

$$0.55 \geq \frac{Co\ (\text{total})}{Co\ (XCS)} \geq 0.9, \tag{IVc}$$

wherein
Co (total) is the comonomer content [wt.-%] of the second heterophasic propylene copolymer (HECO2)
Co (XCS) is the comonomer content [wt.-%] of the xylene cold soluble fraction (XCS) of the second heterophasic propylene copolymer (HECO2).

Further it is appreciated that the xylene cold soluble (XCS) fraction of the second heterophasic propylene copolymer (HECO2) is specified by its intrinsic viscosity. A low intrinsic viscosity (IV) value reflects a low weight average molecular weight. For the present invention it is preferably required that the xylene cold soluble fraction (XCS) of the second heterophasic propylene copolymer (HECO2) has an intrinsic viscosity (IV) measured according to DIN ISO 1628/1 (in decalin at 135° C.) in the range of 1.5 to 2.6 dl/g, like in the range of 1.5 to 2.3 dl/g, more preferably in the range of 1.5 to 2.0 dl/g.

Another characteristic feature of the second heterophasic propylene copolymer (HECO2) is its xylene cold soluble (XCS) fraction. Accordingly, it is appreciated that the second heterophasic propylene copolymer (HECO2) has a xylene cold soluble fraction in the range of 33 to 55 wt.-%, like in the range of 35 to below 53 wt.-%, more preferably in the range of 38 to 52 wt.-%.

Preferably the weight ratio between the propylene copolymer (R-PP2) and the elastomeric propylene copolymer (E2) is 50/50 to 80/20, more preferably 60/40 to 75/25, yet more preferably 65/35 to 75/25.

In the following the propylene copolymer (R-PP2) and the elastomeric propylene copolymer (E2) are defined more precisely.

The propylene copolymer (R-PP2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP2) according to this invention comprises, especially consists of, monomers copolymerizable with propylene from the group consisting of ethylene, 1-butene and 1-hexene. More specifically the propylene copolymer (R-PP2) of this invention comprises—apart from propylene—units derivable from ethylene and/or 1-butene. In a preferred embodiment the propylene copolymer (R-PP2) comprises units derivable from ethylene and propylene only.

The comonomer content of the propylene copolymer (R-PP2) is preferably not more than 11.0 wt.-%, preferably not more than 9.0 wt.-%, more preferably in the range of 3.0 to 11.0 wt.-%, still more preferably in the range of 4.0 to 9.0 wt.-%, yet more preferably in the range of 5.0 to 8.0 wt.-%.

Further it is appreciated that the propylene copolymer (R-PP2) fulfills inequation (V), more preferably inequation (Va), yet more preferably inequation (Vb), still more preferably inequation (Vc), still yet more preferably inequation (Vd), $$\frac{Co\ (\text{total})}{Co\ (RPP)} \geq 1.5, \tag{V}$$

$$\frac{Co\ (\text{total})}{Co\ (RPP)} \geq 1.7, \quad \text{(Va)}$$

$$4.0 \geq \frac{Co\ (\text{total})}{Co\ (RPP)} \geq 1.5, \quad \text{(Vb)}$$

$$3.5 \geq \frac{Co\ (\text{total})}{Co\ (RPP)} \geq 1.7, \quad \text{(Vc)}$$

$$3.8 \geq \frac{Co\ (\text{total})}{Co\ (RPP)} \geq 1.8, \quad \text{(Vd)}$$

wherein
Co (total) is the comonomer content [wt.-%] of the second heterophasic propylene copolymer (HECO2),
Co (RPP) is the comonomer content [wt.-%] of the propylene copolymer (R-PP2).

The comonomer content of the propylene copolymer (R-PP2) has also impact on the amount of xylene cold solubles in the matrix (M2). Thus it is preferred that the amount of the xylene cold soluble (XCS) fraction of the propylene copolymer (R-PP2) is equal or below 30.0 wt.-%, preferably is in the range of 5.0 to equal or below 30.0 wt.-%, more preferably is in the range of 15.0 to equal or below 30.0 wt.-%, like in the range of 15.0 to 25.0 wt.-%.

The propylene copolymer (R-PP2) preferably has a melt flow rate $MFR_2$ (230° C.) in the range of 0.1 to 10 g/10 min, preferably more than 0.5 to equal or below 8.0 g/10 min, more preferably in the range of 0.5 to 7.0 g/10 min, still more preferably in the range of 1.0 to 5.0 g/10 min.

The propylene copolymer (R-PP2) preferably comprises at least two polymer fractions, like two or three polymer fraction, all of them are propylene copolymers. Preferably the propylene copolymer (R-PP2) comprises at least two different propylene copolymer fractions, like two different propylene copolymer fractions, wherein further the two propylene copolymer fractions differ in the comonomer content and/or in the melt flow rate $MFR_2$ (230° C.), preferably differ in the comonomer content and in the melt flow rate $MFR_2$ (230° C.).

Preferably one fraction of the two polymer copolymer fractions of the propylene copolymer (R-PP2) is the comonomer lean fraction and the other fraction is the comonomer rich fraction, wherein further the lean fraction and the rich fraction fulfils inequation (VI), more preferably inequation (VIa), still more preferably inequation (VIb), $$\frac{Co(\text{lean})}{Co(\text{rich})} \leq 0.50, \quad \text{(VI)}$$

$$0.10 \leq \frac{Co(\text{lean})}{Co(\text{rich})} \leq 0.45, \quad \text{(VIa)}$$

$$0.15 \leq \frac{Co(\text{lean})}{Co(\text{rich})} \leq 0.40 \quad \text{(VIb)}$$

wherein
Co (lean) is the comonomer content [wt.-%] of the fraction of the propylene copolymer (R-PP2) with the lower comonomer content,
Co (rich) is the comonomer content [wt.-%] of the fraction of the propylene copolymer (R-PP2) with the higher comonomer content.

In a preferred embodiment, the comonomer lean fraction of the propylene copolymer (R-PP2) has a comonomer content of equal or below 5.0 wt.-%, more preferably of equal or below 4.0 wt.-%, yet more preferably in the range 0.5 to 5.0 wt.-%, still more preferably in the range 1.0 to 4.0 wt.-%, like in the range of 1.5 to 3.5 wt.-%.

As the comonomer of the comonomer lean fraction of the propylene copolymer (R-PP2) preferably is rather low, also its xylene cold soluble (XCS) is comparably low. Thus it is preferred that the amount of the xylene cold soluble (XCS) fraction of the comonomer lean fraction of the propylene copolymer (R-PP2) is equal or below than 8.0 wt.-%, more preferably is in the range of 1.0 to 8.0 wt.-%, still more preferably is in the range of 2.0 to 7.0 wt.-%, yet more preferably is in the range of 2.5 to 6.0 wt.-%.

Preferably the comonomer lean fraction of the propylene copolymer (R-PP2) preferably has a melt flow rate $MFR_2$ (230° C.) in the range of in the range of 0.3 to 3.5 g/10 min, more preferably in the range of 0.5 to 2.5 g/10 min.

On the other hand, the comonomer rich fraction of the propylene copolymer (R-PP2) preferably has a comonomer content in the range of 3.0 to 15.0 wt.-%, still more preferably in the range of 5.0 to 13.0 wt.-%, yet more preferably in the range of 6.0 to 11.0 wt.-%.

The comonomers of the comonomer lean fraction and the comonomer rich fraction of the propylene copolymer (R-PP2), respectively, copolymerizable with propylene, are ethylene and/or $C_4$ to $C_{12}$ α-olefins, in particular ethylene and/or $C_4$ to $C_8$ α-olefins, e.g. 1-butene and/or 1-hexene. Preferably the comonomer lean fraction and comonomer rich fraction of the propylene copolymer (R-PP2), respectively, comprise, especially consist of, monomers copolymerizable with propylene from the group consisting of ethylene, 1-butene and 1-hexene. More specifically the comonomer lean fraction and the comonomer rich fraction of the propylene copolymer (R-PP2), respectively, comprise—apart from propylene—units derivable from ethylene and/or 1-butene. In a preferred embodiment, the comonomer lean fraction and the comonomer rich fraction of the propylene copolymer (R-PP2) comprise the same comonomers, i.e. ethylene only.

Preferably the comonomer rich fraction of the propylene copolymer (R-PP2) preferably has a melt flow rate $MFR_2$ (230° C.) in the range of 0.1 to 8.5 g/10 min, more preferably in the range of 0.3 to 7.5 g/10 min.

Preferably the weight ratio between the comonomer lean fraction and the comonomer rich fraction of the propylene copolymer (R-PP2) is 20/80 to 80/20, more preferably 30/70 to 70/30, like 40/60 to 60/40. In a preferred embodiment, the weight ratio between the comonomer lean fraction and the comonomer rich fraction is 35/65 to 45/55.

As mentioned above a further component of the second heterophasic propylene copolymer (HECO2) is the elastomeric propylene copolymer (E2) dispersed in the matrix (M2), i.e. in the propylene copolymer (R-PP2). Concerning the comonomers used in the elastomeric propylene copolymer (E2) it is referred to the information provided for the second heterophasic propylene copolymer (HECO2) and the propylene copolymer (R-PP2), respectively. Accordingly the elastomeric propylene copolymer (E2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the elastomeric propylene copolymer (E2) comprises, especially consists of, monomers copolymerizable with propylene from the group consisting of ethylene, 1-butene and 1-hexene. More specifically the elastomeric propylene copolymer (E2) comprises—apart from propylene—units derivable from ethylene and/or 1-butene. Thus in an especially preferred embodiment the elastomeric propylene copolymer (E2) comprises units derivable from ethylene and propylene only. It is especially preferred that the propylene copolymer (R-PP2) and the elastomeric propylene copolymer (E2) comprises the same comonomers. Accordingly in one specific embodiment the propylene copolymer (R-PP2) and the elastomeric propylene copolymer (E2) comprise propylene and ethylene only.

The comonomer content of the elastomeric propylene copolymer (E2) preferably is not more than 38.0 wt.-%, still more preferably in the range of 10.0 to 30.0 wt.-%, yet more preferably in the range of more than 15.0 to 28.0 wt-%, even more preferably in the range of more than 18.0 to 26.0 wt.-%.

The second heterophasic propylene copolymer (HECO2), i.e. the heterophasic propylene copolymer (RAHECO), as defined in the instant invention may contain up to 5.0 wt.-% additives, like α-nucleating agents and antioxidants, as well as slip agents and antiblocking agents. Preferably the additive content is below 3.0 wt.-%, like below 1.0 wt.-%

In one embodiment the second heterophasic propylene copolymer (HECO2) comprises an α-nucleating agent. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butyl-phenyl)phosphate], and (iv) vinylcycloalkane polymer and vinylalkane polymer (as discussed in more detail below), and (v) mixtures thereof.

Such additives are generally commercially available and are described, for example, in "Plastic Additives Handbook", 5th edition, 2001 of Hans Zweifel.

In case the second heterophasic propylene copolymer (HECO2) comprises an α-nucleating agent the amount is preferably up to 5 wt.-%. More preferably the second heterophasic propylene copolymer (HECO2) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

As in case of the first heterophasic propylene copolymer (HECO1), the instant second propylene copolymer (HECO2) is also preferably obtained by a specific process.

Accordingly the instant second heterophasic propylene copolymer (HECO2) is preferably obtained by a sequential polymerization process comprising the steps of (a) polymerizing in a first reactor (R1') propylene and ethylene and/or a $C_4$ to $C_{12}$ α-olefin, preferably ethylene, obtaining a first polymer fraction, i.e. a first propylene copolymer fraction, (b) transferring the first polymer fraction, i.e. the first propylene copolymer fraction, into a second reactor (R2'), (c) polymerizing in said second reactor (R2') in the presence of the first polymer fraction, i.e. of the first propylene copolymer fraction, propylene and ethylene and/or a $C_4$ to $C_{12}$ α-olefin, preferably ethylene, obtaining a second polymer fraction, i.e. a second propylene copolymer fraction, the first and second polymer fraction form the propylene copolymer (R-PP2), (d) transferring said propylene copolymer (R-PP2), into a third reactor (R3'), (e) polymerizing in said third reactor (R3') in the presence of the propylene copolymer (R-PP2), propylene and ethylene and/or a $C_4$ to $C_{12}$ α-olefin, preferably ethylene, obtaining a third polymer fraction, said third polymer fraction is the elastomeric propylene copolymer (E2); the third polymer fraction and the propylene copolymer (R-PP2), form the second heterophasic propylene copolymer (HECO2), and (f) removing the propylene copolymer from the third reactor (R3').

Preferably between the second reactor (R2'), and the third reactor (R3') the monomers are flashed out.

The term "sequential polymerization process" indicates that the second heterophasic propylene copolymer (HECO2), i.e. the heterophasic propylene copolymer (RAHECO), is produced in at least three reactors, preferably in four reactors, connected in series. Accordingly the present process comprises at least a first reactor (R1'), a second reactor (R2'), and a third reactor (R3'). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

As stated above in the first two reactors the matrix, i.e. the propylene copolymer (R-PP2) is produced. More precisely, in the first reactor (R1') the first propylene copolymer fraction is produced whereas in the second reactor (R2') the second propylene copolymer fraction is obtained.

The preferred comonomers used in the first reactor (R1') are the same as indicated above, for the first propylene copolymer fraction. Accordingly especially preferred comonomers are ethylene, 1-butene and 1-hexene. In one specific embodiment the comonomer is ethylene.

Preferably the weight ratio between the first propylene copolymer fraction and the second propylene copolymer fraction is 20/80 to 80/20, more preferably 30/70 to 70/30, yet more preferably 40/60 to 60/40.

Accordingly in the first reactor (R1') a first propylene copolymer fraction is produced whereas in the second rector (R2') the second propylene copolymer fraction is produced obtaining thereby the propylene copolymer (R-PP2). Concerning the individual properties reference is made to the information provided above.

The comonomers of the propylene copolymer (R-PP2), of the first propylene copolymer fraction, and of the second propylene copolymer fraction copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP2), the first propylene copolymer fraction, and the second propylene copolymer fraction comprise, especially consist of, monomers copolymerizable with propylene from the group consisting of ethylene, 1-butene and 1-hexene. More specifically the propylene copolymer (R-PP2), the first propylene copolymer fraction and the second propylene copolymer fraction comprise—apart from propylene—units derivable from ethylene and/or 1-butene. In a preferred embodiment the propylene copolymer (R-PP2), the first propylene copolymer fraction and the second propylene copolymer fraction comprise the same comonomers, i.e. ethylene only.

After the second reactor (R2') the matrix (M2), i.e. the propylene copolymer (R-PP2), of the second heterophasic propylene copolymer (HECO2), i.e. the heterophasic propylene copolymer (RAHECO), is obtained. This matrix (M2) is subsequently transferred into the third reactor (R3') in which the elastomeric propylene copolymer (E2) is produced (step (e)) and thus the second heterophasic propylene copolymer (HECO2), i.e. the heterophasic propylene copolymer (RAHECO), of the instant invention is obtained.

Preferably the weight ratio between the matrix (M2), i.e. the propylene copolymer (R-PP2), after step (c) and the elastomeric propylene copolymer (E2) produced in the step (e) is 50/50 to 80/20, more preferably 60/40 to 75/25.

The first reactor (R1') is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2'), and the third reactor (R3') are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1') is a slurry reactor (SR), like loop reactor (LR), whereas the second reactor (R2'), and third reactor (R3') are gas phase reactors (GPR). Accordingly for the instant process for producing the second heterophasic propylene copolymer (HECO2) at least three, preferably three polymerization reactors, namely a slurry reactor (SR), like loop reactor (LR), a first gas phase reactor (GPR-1), and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the second heterophasic propylene copolymer (HECO2), i.e. the heterophasic propylene copolymer (RAHECO), as defined above the conditions for the first reactor (R1'), i.e. the slurry reactor (SR), like a loop reactor (LR), of step (a) may be as follows:
 the temperature is within the range of 40° C. to 110° C., preferably between 60° C. and 100° C., like 68 to 95° C.,
 the pressure is within the range of 20 bar to 80 bar, preferably between 40 bar to 70 bar,
 hydrogen can be added for controlling the molar mass in a manner known per se.

Subsequently, the reaction mixture from step (a) is transferred to the second reactor (R2'), i.e. gas phase reactor (GPR-1), i.e. to step (c), whereby the conditions in step (c) are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The condition in the third reactor (R3'), preferably in the second gas phase reactor (GPR-2), is similar to the second reactor (R2').

The residence time can vary in the three reactor zones.

In one embodiment of the process for producing the second heterophasic propylene copolymer (HECO2) the residence time the first reactor (R1'), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first reactor (R1'), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention, the second heterophasic propylene copolymer (HECO2) is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa), as described above in accordance with the preparation of the first heterophasic propylene copolymer (HECO1).

More preferably the external donor is of formula (IIIa), like dicyclopentyl dimethoxy silane [Si(OCH$_3$)$_2$(cyclopentyl)$_2$] or diisopropyl dimethoxy silane [Si(OCH$_3$)$_2$(CH(CH$_3$)$_2$)$_2$].

Polyolefin Composition and its Use

The first heterophasic propylene copolymer (HECO1) and the second heterophasic propylene copolymer (HECO2) are combined to form the inventive polyolefin composition. Blending can be achieved in any conventional manner such as e.g. in an extruder.

In order to obtain the desired properties, the heterophasic propylene copolymer are preferably blended in a specific mixing ratio. Thus, inventive polyolefin composition preferably comprises the first heterophasic propylene copolymer (HECO1) and the second heterophasic propylene copolymer (HECO2) in a weight ratio [(HECO1):(HECO2)] of 6:1 to 99:1, more preferably of 7:1 to 50:1, still more preferably in the range of 8.1 to 40:1. The inventive polyolefin composition may comprise further polymers, however it is preferred that the two heterophasic propylene copolymers (HECO1) and (HECO2) constitute the main amount of the composition. Therefore it is preferred that the two heterophasic propylene copolymers (HECO1) and (HECO2) make up at least 50 wt.-%, more preferably at least 70 wt.-%, still more preferably at least 80 wt.-%, yet more preferably at least 90 wt.-%, like at least 95 wt.-% of the inventive polyolefin composition. The remaining part may be additives or polymers used as carrier for the additives.

The polyolefin composition of the present invention is preferably used for the production of automotive articles, like moulded automotive articles, preferably automotive injection moulded articles. Even more preferred is the use for the production of car interiors and exteriors, like bumpers, side trims, step assists, body panels, spoilers, dashboards, interior trims and the like.

The current invention also provides (automotive) articles, like injection molded articles, comprising at least to 60 wt.-%, more preferably at least 80 wt.-%, yet more preferably at least 95 wt.-%, like consisting, of the inventive polyolefin composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polyolefin composition.

The present invention will now be described in further detail by the examples provided below.

EXAMPLES

1. Definitions/Measuring Methods

The following definitions of terms and determination methods apply for the above general description of the invention as well as to the below examples unless otherwise defined.

Calculation of comonomer content of the second fraction of the propylene copolymer (R-PP2):

$$\frac{C(PP) - w(PP1) \times C(PP1)}{w(PP2)} = C(PP2)$$

wherein
w(PP1) is the weight fraction [in wt.-%] of the first fraction of the propylene copolymer (R-PP1),
w(PP2) is the weight fraction [in wt.-%] of second fraction of the propylene copolymer (R-PP2),
C(PP1) is the comonomer content [in wt-%] of the first fraction of the propylene copolymer (R-PP1),
C(PP) is the comonomer content [in wt.-%] of the propylene copolymer (R-PP),
C(PP2) is the calculated comonomer content [in wt-%] of the second fraction of the propylene copolymer (R-PP2).

Calculation of the xylene cold soluble (XCS) content of the second fraction of the propylene copolymer (R-PP2):

$$\frac{XS(PP) - w(PP1) \times XS(PP1)}{w(PP2)} = XS(PP2)$$

wherein
w(PP1) is the weight fraction [in wt.-%] of the first fraction of the propylene copolymer (R-PP1),
w(PP2) is the weight fraction [in wt.-%] of second fraction of the propylene copolymer (R-PP2),
XS(PP1) is the xylene cold soluble (XCS) content [in wt.-%] of the first fraction of the propylene copolymer (R-PP1),
XS(PP) is the xylene cold soluble (XCS) content [in wt.-%] of the propylene copolymer (R-PP),
XS(PP2) is the calculated xylene cold soluble (XCS) content [in wt.-%] of the second fraction of the propylene copolymer (R-PP2).

Calculation of melt flow rate MFR$_2$ (230° C.) of the second fraction of the propylene copolymer (R-PP2):

$$MFR(PP2) = 10^{\left[\frac{log(MFR(PP)) - w(PP1) \times log^{-1}(MFR(PP1))}{w(PP2)}\right]}$$

wherein
w(PP1) is the weight fraction [in wt.-%] of the first fraction of the propylene copolymer (R-PP1),
w(PP2) is the weight fraction [in wt.-%] of second fraction of the propylene copolymer (R-PP2),
MFR(PP1) is the melt flow rate MFR$_2$ (230° C.) [in g/10 min] of the first fraction of the propylene copolymer (R-PP1),
MFR(PP) is the melt flow rate MFR$_2$ (230° C.) [in g/10 min] of the propylene copolymer (R-PP),
MFR(PP2) is the calculated melt flow rate MFR$_2$ (230° C.) [in g/10 min] of the second fraction of the propylene copolymer (R-PP2).

Calculation of comonomer content of the elastomeric propylene copolymer (E), respectively:

$$\frac{C(HECO) - w(PP) \times C(PP)}{w(E)} = C(E)$$

wherein
w(PP) is the weight fraction [in wt.-%] of the propylene copolymer (R-PP), i.e. polymer produced in the first and second reactor (R1+R2),
w(E) is the weight fraction [in wt.-%] of the elastomeric propylene copolymer (E), i.e. polymer produced in the third and fourth reactor (R3+R4)

C(PP) is the comonomer content [in wt.-%] of the propylene copolymer (R-PP), i.e. comonomer content [in wt.-%] of the polymer produced in the first and second reactor (R1+R2), C(HECO) is the comonomer content [in wt.-%] of the propylene copolymer, i.e. is the comonomer content [in wt.-%] of the polymer obtained after polymerization in the fourth reactor (R4), C(E) is the calculated comonomer content [in wt.-%] of elastomeric propylene copolymer (E), i.e. is the comonomer content [in wt.-%] of the polymer produced in the third and fourth reactor (R3+R4).

Quantification of Microstructure by NMR Spectroscopy

Quantitative nuclear-magnetic resonance (NMR) spectroscopy was used to quantify the comonomer content of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\gamma\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

DSC analysis, melting temperature ($T_m$) and heat of fusion ($H_f$), crystallization temperature ($T_c$) and heat of crystallization ($H_c$): measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature and heat of crystallization ($H_e$) are determined from the cooling step, while melting temperature and heat of fusion ($H_f$) are determined from the second heating step.

MFR$_2$ (230° C.) is measured according to ISO 1133 (230° C., 2.16 kg load).

The xylene cold solubles (XCS, wt.-%): Content of xylene cold solubles (XCS) is determined at 25° C. according ISO 16152; first edition; 2005-07-01

Intrinsic viscosity is measured according to DIN ISO 1628/1, October 1999 (in Decalin at 135° C.).

Tensile Modulus; Tensile strain at break are measured according to ISO 527-2 (cross head speed=1 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179 2C/DIN 53453 at 23° C., −20° C., using injection molded bar test specimens of 80×10×4 mm$^3$ mm$^3$ prepared in accordance with ISO 294-1:1996.

2. Examples

The catalyst used in the polymerization processes has been produced as follows: First, 0.1 mol of MgCl$_2$×3 EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl₄ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) (HECO2) and diethylaminotriethoxysilane [U-Donor] (HECO1), respectively, were used. The aluminum to donor ratio is indicated in table 1

TABLE 1a

Preparation of heterophasic propylene copolymers (HECO)

| Parameter | unit | HECO 1 | HECO 2 |
|---|---|---|---|
| Prepolymerisation | | | |
| temperature | [° C.] | 30 | 30 |
| pressure | [bar] | 56 | 54 |
| Al/donor ratio | [mol/mol] | 5.1 | 15 |
| residence time | [h] | 0.25 | 0.2 |
| Loop | | | |
| temperature | [° C.] | 72 | 71 |
| pressure | [kPa] | 56 | 54 |
| residence time | [h] | 0.22 | 0.4 |
| C2/C3 ratio | [mol/kmol] | 0 | 5.9 |
| H2/C3 ratio | [mol/kmol] | 26.9 | 1.2 |
| C2 | [wt.-%] | 0 | 2.3 |
| XCS | [wt.-%] | 3.4 | 4.9 |
| MFR | [g/10 min] | 294 | 0.9 |
| GPR1 | | | |
| temperature | [° C.] | 87 | 75 |
| pressure | [bar] | 22 | 21 |
| residence time | [h] | 0.34 | 0.2 |
| C2/C3 ratio | [mol/kmol] | 0 | 43.2 |
| H2/C3 ratio | [mol/kmol] | 121.1 | 12.2 |
| C2 | [wt.-%] | 0 | 6.2 |
| XCS | [wt.-%] | 3.1 | 18.0 |
| MFR | [g/10 min] | 230 | 1.0 |
| Split | [wt.-%] | 34.8 | 37 |

TABLE 1b

Preparation of heterophasic propylene copolymers (HECO)

| Parameter | unit | HECO 1 | HECO 2 |
|---|---|---|---|
| GPR2 | | | |
| temperature | [° C.] | 82 | 80 |
| pressure | [bar] | 22 | 21 |
| residence time | [h] | 0.13 | 0.3 |
| H2/C3 ratio | [mol/kmol] | 22.0 | 375 |
| C2/C3 ratio | [mol/kmol] | 305 | 283 |
| C2 | [wt.-%] | 9.7 | 12.5 |
| XCS | [wt.-%] | 21.6 | 41.3 |
| MFR | [g/10 min] | 67 | 1.3 |
| GPR3 | | | |
| temperature | [° C.] | 85 | 80 |
| pressure | [bar] | 22 | 17 |
| residence time | [h] | 0.58 | 0.6 |
| H2/C2 ratio | [mol/kmol] | 71.8 | 358 |
| C2/C3 ratio | [mol/kmol] | 305 | 307 |

TABLE 1b-continued

Preparation of heterophasic propylene copolymers (HECO)

| Parameter | unit | HECO 1 | HECO 2 |
|---|---|---|---|
| C2 | [wt.-%] | 13.7 | 14.4 |
| XCS | [wt.-%] | 29 | 51 |
| MFR | [g/10 min] | 34 | 1.6 |
| Split Loop/GPR1/GPR2/GPR3 | [wt.-%] | 37.6/34.8/18.5/9.1 | 23/37/28/12 |

TABLE 2

The heterophasic polypropylenes (HECO)

| | | HECO 1 | HECO 2 |
|---|---|---|---|
| MFR of Matrix | [g/10 min] | 230 | 1.0 |
| XCS of Matrix | [wt. %] | 3.1 | 18 |
| C2 of Matrix | [wt. %] | 0 | 6.2 |
| MFR | [g/10 min] | 34 | 1.6 |
| XCS | [wt. %] | 29 | 51 |
| C2 total | [wt. %] | 13.7 | 14.4 |
| C2 in XCS | [wt. %] | 37.5 | 23.0 |
| IV of XCS | [dl/g] | 2.7 | 1.8 |

Polyolefin compositions according to the present invention were produced by melt blending two heterophasic propylene copolymers.

TABLE 3

Properties of the inventive examples and comparative examples

| | | Example | | | | |
|---|---|---|---|---|---|---|
| | | CE 1 | CE 2 | IE 1 | IE2 | IE 3 |
| HECO 1 | [wt %] | 100 | — | 97 | 95 | 90 |
| HECO 2 | [wt %] | — | 100 | 3 | 5 | 10 |
| MFR | [g/10 min] | 35 | 3.7 | 28 | 28 | 23 |
| Tensile Modulus | [MPa] | 1107 | 279 | 1071 | 1045 | 963 |
| Tensile strain at break | [%] | 16 | 525 | 37 | 38 | 90 |
| Impact strength +23° C. | [kJ/m²] | 11.9 | 76.2 | 38 | 41 | 54 |
| Impact strength −20° C. | [kJ/m²] | 6.4 | 33.6 | 8.0 | 8.0 | 8.1 |

The characterization of the base polymers are summarized in Table 2. The properties of inventive and comparative examples is summarized in Table 3. CE1 relates to a first heterophasic propylene copolymer (HECO1) and CE2 relates to a second heterophasic propylene copolymer (HECO2). The results described in table 3 show an improvement in the balance of toughness and stiffness.

The invention claimed is:
1. A polyolefin composition comprising
 (a) a first heterophasic propylene copolymer (HECO1) having
  (i) a melt flow rate MFR₂ (230° C.) measured according to ISO 1133 in the range of 15.0 to 55.0 g/10 min, and
  (ii) a xylene cold soluble content (XCS) determined according ISO 16152 (25° C.) in the range of 24 to 38 wt.-%,
 wherein further
  (iii) the intrinsic viscosity (IV) determined according to DIN ISO 1628/1 (in decalin at 135° C.) of the xylene cold soluble (XCS) fraction of the heterophasic propylene copolymer (HECO1) is in the range of 2.0 to 3.5 dl/g, and

(b) a second heterophasic propylene copolymer (HECO2) having
  (i) a melt flow rate MFR$_2$ (230° C.) measured according to ISO 1133 in the range of 0.5 to 8.0 g/10 min, and
  (ii) a xylene cold soluble content (XCS) determined according ISO 16152 (25° C.) in the range of 33 to 55 wt.-%,
wherein further
  (iii) the intrinsic viscosity (IV) determined according to DIN ISO 1628/1 (in decalin at 135° C.) of the xylene cold soluble (XCS) fraction of the heterophasic propylene copolymer (HECO2) is in the range of 1.5 to 2.6 dl/g,
wherein the polyolefin composition comprises the first heterophasic propylene copolymer (HECO1) and the second heterophasic propylene copolymer (HECO2) in a weight ratio [(HECO1):(HECO2)] of 6:1 to 99:1, and HECO1 and HECO2 make up at least 95 wt.-%, of the polyolefin composition, the remaining part being additives or additional polymers utilized as carrier for the additives.

2. The polyolefin composition according to claim 1, wherein the ratio of the melt flow rate MFR$_2$ (230 ° C.) of the first heterophasic propylene copolymer (HECO1) to the second heterophasic propylene copolymer (HECO2) fulfills the in-equation (I), $$\frac{MFR(1)}{MFR(2)} \geq 5, \qquad (I)$$

wherein
MFR (1) is the melt flow rate MFR$_2$ (230 ° C.) of the first heterophasic propylene copolymer (HECO1) and
MFR (2) is the melt flow rate MFR$_2$ (230 ° C.) of the second heterophasic propylene copolymer (HECO2).

3. The polyolefin composition according to claim 1, wherein
  (i) the first heterophasic propylene copolymer (HECO1) has a comonomer content in the range of 6.0 to 17.0 wt.-%, and/or
  (ii) the comonomer content of the xylene cold soluble (XCS) fraction of the first heterophasic propylene copolymer (HECO1) is in the range of 26 to 40 wt.-%.

4. The polyolefin composition according to claim 1, wherein
  (i) the second heterophasic propylene copolymer (HECO2) has a comonomer content in the range of 10.0 to 30.0 wt.-%, and/or
  (ii) the comonomer content of the xylene cold soluble (XCS) fraction of the second heterophasic propylene copolymer (HECO2) is in the range of 10 to 30 wt.-%.

5. The polyolefin composition according to claim 1, wherein the first heterophasic propylene copolymer (HECO1) comprises a polypropylene (PP1) as matrix and an elastomeric propylene copolymer (E1) dispersed in the matrix.

6. The polyolefin composition according to claim 1, wherein the second heterophasic propylene copolymer (HECO2) comprises a propylene copolymer (R-PP2) as matrix and an elastomeric propylene copolymer (E2) dispersed in the matrix.

7. The polyolefin composition according to claim 1, wherein
  (i) the first heterophasic propylene copolymer (HECO1) has a melting temperature Tm in the range of 135 to 168° C., and/or
  (ii) the second heterophasic propylene copolymer (HECO2) has a melting temperature Tm in the range of 140 to 155° C.

8. An automotive article comprising at least 60 wt.-% of the polyolefin composition according to claim 1.

9. The automotive article according to claim 8, wherein the automotive article is selected from the group consisting of bumpers, side trims, step assists, body panels, spoilers, dashboards, and interior trims.

10. The polyolefin composition according to claim 5, wherein
  (i) the polypropylene (PP1) is a propylene homopolymer (H-PP1), and/or
  (ii) the polypropylene (PP1) has a melt flow rate MFR$_2$ (230° C.) measured according to ISO 1133 of 60 to 400 g/10 min.

11. The polyolefin composition according to claim 2, wherein
  (i) the first heterophasic propylene copolymer (HECO1) has a comonomer content in the range of 6.0 to 17.0 wt.-%, and/or
  (ii) the comonomer content of the xylene cold soluble (XCS) fraction of the first heterophasic propylene copolymer (HECO1) is in the range of 26 to 40 wt.-%.

12. The polyolefin composition according to claim 2, wherein
  (i) the second heterophasic propylene copolymer (HECO2) has a comonomer content in the range of 10.0 to 30.0 wt.-%, and/or
  (ii) the comonomer content of the xylene cold soluble (XCS) fraction of the second heterophasic propylene copolymer (HECO2) is in the range of 10 to 30 wt.-%.

13. The polyolefin composition according to claim 2, wherein the first heterophasic propylene copolymer (HECO1) comprises a polypropylene (PP1) as matrix and an elastomeric propylene copolymer (E1) dispersed in the matrix.

14. The polyolefin composition according to claim 2, wherein the second heterophasic propylene copolymer (HECO2) comprises a propylene copolymer (R-PP2) as matrix and an elastomeric propylene copolymer (E2) dispersed in the matrix.

15. The polyolefin composition according to claim 14, wherein the propylene copolymer (R-PP2) has
  (i) a comonomer content of 3.0 to 11.0 wt.-%, wherein the comonomers are ethylene and/or a $C_4$ to $C_{12}$ α-olefin, and/or
  (ii) a melt flow rate MFR$_2$ (230° C.) measured according to ISO 1133 in the range of 0.1 to 10 g/10 min.

16. The polyolefin composition according to claim 2, wherein
  (i) the first heterophasic propylene copolymer (HECO1) has a melting temperature Tm in the range of 135 to 168° C., and/or
  (ii) the second heterophasic propylene copolymer (HECO2) has a melting temperature Tm in the range of 140 to 155° C.

* * * * *